US012664390B2

(12) United States Patent
Herzog et al.

(10) Patent No.: US 12,664,390 B2
(45) Date of Patent: Jun. 23, 2026

(54) INTER-APPLICATION DATA COMMUNICATION SYSTEM

(71) Applicant: Target Brands, Inc., Minneapolis, MN (US)

(72) Inventors: Laura Herzog, Minneapolis, MN (US); Bill Bergmann, Minneapolis, MN (US); Rachel Peddie, Minneapolis, MN (US); Kathleen Zuna Gomez, Minneapolis, MN (US); Samuel Clark, Minneapolis, MN (US); Priyanka Mutyala, Minneapolis, MN (US); Chelina Ortiz Montanez, Minneapolis, MN (US); Benjamin Kelenski, East Lansing, MI (US); Bharathy Sekar, Minneapolis, MN (US); Anna Maxam, Minneapolis, MN (US); Joakim Sternberg, Minneapolis, MN (US); Margaret Ostrander, San Francisco, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/902,529

(22) Filed: Sep. 30, 2024

(65) Prior Publication Data

US 2026/0093946 A1 Apr. 2, 2026

(51) Int. Cl.
*G06K 9/36* (2006.01)
*G06F 9/54* (2006.01)
(Continued)

(52) U.S. Cl.
CPC ........ *G06K 19/06112* (2013.01); *G06F 9/547* (2013.01); *G06K 7/1413* (2013.01); *G06K 7/1417* (2013.01)

(58) Field of Classification Search
CPC .... G06F 9/547; G06F 16/955; G06F 16/9554; G06K 7/1417; G06K 19/06037; G06K 19/06112; G06K 19/06028; G06K 7/1413
(Continued)

(56) References Cited

U.S. PATENT DOCUMENTS

| 7,010,501 B1 * | 3/2006 | Roslak ................... G06Q 20/20 |
| | | 705/26.8 |
| 10,535,036 B2 * | 1/2020 | Cantrell ................ H04W 4/021 |

(Continued)

OTHER PUBLICATIONS

Amrutkar et al., QR Code based Stock Management System (Jun. 2017).
(Continued)

*Primary Examiner* — Daniel St Cyr
(74) *Attorney, Agent, or Firm* — Merchant & Gould P.C.

(57) ABSTRACT

A system for exchanging data between applications is disclosed. In an example embodiment, a printer communicatively coupled with a first application prints a plurality of codes, which are affixed to a plurality of loads. A second application later scans codes affixed to loads. Based on the scanned codes, the second application generates an aggregate code that encodes identifiers of the loads. The second application displays the aggregate code on a screen, and the first application may scan the displayed aggregate code. The first application may compare identifiers encoded by the aggregate code with a list of identifiers to determine whether the second application ingested all expected identifiers.

20 Claims, 11 Drawing Sheets

(51) Int. Cl.
*G06K 7/14* (2006.01)
*G06K 19/06* (2006.01)

(58) Field of Classification Search
USPC ............................................. 235/462.1, 383
See application file for complete search history.

(56) References Cited

U.S. PATENT DOCUMENTS

| | | | |
|---|---|---|---|
| 11,288,563 B2 | 3/2022 | Lee et al. | |
| 11,403,590 B2 | 8/2022 | Mo et al. | |
| 11,593,750 B2 | 2/2023 | Sandberg et al. | |
| 11,605,052 B2 | 3/2023 | Hwang et al. | |
| 2004/0068443 A1* | 4/2004 | Hopson .................. | G06Q 10/08 |
| | | | 705/5 |
| 2020/0118079 A1 | 4/2020 | Lafrance | |
| 2021/0103892 A1 | 4/2021 | Han et al. | |
| 2022/0012678 A1 | 1/2022 | Cheung et al. | |
| 2022/0268620 A1* | 8/2022 | Schiller ............... | G06Q 10/087 |
| 2023/0121652 A1* | 4/2023 | Francis ............. | G06Q 30/0639 |
| | | | 705/26.8 |
| 2023/0196262 A1* | 6/2023 | Hollenbeck ........... | G06Q 10/08 |
| | | | 705/333 |
| 2023/0245038 A1 | 8/2023 | Padmanabhan et al. | |
| 2023/0298087 A1* | 9/2023 | Nelson ............... | G06Q 30/0635 |
| | | | 705/26.81 |
| 2024/0161060 A1* | 5/2024 | Francis ............... | G06Q 10/087 |

OTHER PUBLICATIONS

Pipatprapa, QR Code on Mobile Platform for Improving Order Picking Process of Lean Factory Warehouse (Feb. 2019).

* cited by examiner

400

Receive orders 402

Create loads 404

Generate identifiers 406

Print codes 408

Affix codes to loads 410

Send identifiers to platform 412

Receive notification to meet deliverer 414

Ingest aggregate code 416

Determine whether deliverer device ingested all expected identifiers 418

Reconcile mismatches 420

Update platform 422

500

Receive delivery data 502

Arrive at pick up node 504

Ingest identifiers 506

Generate aggregate code 508

Display aggregate code 510

Reconcile mismatches 512

Depart from pick up node 514

Arrive at drop off node 516

104

1006

1008

Select reason for mismatch

○ Deliverer device
○ Worker device
○ Code issue
○ Package issue
○ Worker unavailable

• • •

Continue

102

1002

1004

Select reason for mismatch

○ Deliverer capacity
○ Deliverer refusal
○ No access to pallet
○ Pallet issue
○ Package issue

• • •

INTER-APPLICATION DATA COMMUNICATION SYSTEM

BACKGROUND

Accurately and efficiently exchanging data between computing systems can be a challenge. When the data to be exchanged may be updated or changed, or altered by intervening, unpredictable circumstances, such as computer outages, human action, or other events, then this challenge may be become more difficult. In an example context, it can be a challenge for different computing systems used in inventory tracking and logistics to accurately and efficiently exchange inventory data, which may be updated and altered, occasionally in an unpredictable manner. In the context of inventory tracking and logistics, failure to exchange such data may cause computing systems to have inconsistent data records, resulting in downstream errors, human intervention to correct such errors, inventory mismanagement, and other issues.

SUMMARY

In general terms, aspects of the present disclosure relate to a system for exchanging data between applications. In an example embodiment, a printer communicatively coupled with a first application prints a plurality of codes, which are affixed to a plurality of loads. A second application later scans codes affixed to loads. Based on the scanned codes, the second application generates an aggregate code that encodes identifiers of the loads. The second application displays the aggregate code on a screen, and the first application may scan the displayed aggregate code. The first application may compare identifiers encoded by the aggregate code with a list of identifiers to determine whether the second application ingested all expected identifiers.

In a first aspect, a method for inter-application data communication is disclosed. The method comprises by a printer communicatively coupled with a first mobile application installed on a first mobile device, printing a plurality of codes corresponding to a plurality of identifiers, the plurality of identifiers being associated with a plurality of loads; by the first mobile device, sending the plurality of identifiers to a backend platform; by a second mobile device, receiving the plurality of identifiers from the backend platform; by a second mobile application installed on the second mobile device, scanning, using a second scanner of the second mobile device, the plurality of codes, wherein the plurality of codes are affixed to the plurality of loads; by the second mobile application, generating an aggregate code corresponding to the plurality of codes; by the second mobile application, displaying the aggregate code on a screen of the second mobile device; by the first mobile application, scanning, using a first scanner of the first mobile device, the aggregate code displayed on the screen of the second mobile device; and by the first mobile application, comparing data encoded by the aggregate code to the plurality of identifiers to determine whether the second mobile application ingested each identifier of the plurality of identifiers.

In a second aspect, a data communication system is disclosed. The system comprises a first mobile device comprising a first mobile application, the first mobile application being communicatively coupled with a printer; a second mobile device comprising a second mobile application; and a platform communicatively coupled with the first mobile device and the second mobile device; wherein the first mobile device includes a first memory storing first instructions associated with the first mobile application that, when executed by a first processor, cause the first mobile device to: print, using the printer, a plurality of codes corresponding to a plurality of identifiers, the plurality of identifiers being associated with a plurality of loads; and send the plurality of identifiers to the backend platform; wherein the platform includes a second memory storing second instructions that, when executed by a second processor, cause the platform to: receive the plurality of identifiers from the first mobile device; identify the second mobile device from among a plurality of deliverer devices; and send the plurality of identifiers to the second mobile device; wherein the second mobile device includes a third memory storing third instructions associated with the second mobile application that, when executed by a third processor, cause the second mobile device to: receive the plurality of identifiers: scan a plurality of codes affixed to a plurality of available loads at a node; generate an aggregate code that encodes data corresponding to the plurality of scanned codes; and display the aggregate code on a screen of the second mobile device; wherein the first instructions, when executed by the first processor, further cause the first mobile device to: scan the aggregate code displayed on the screen of the second mobile device; and compare data of the aggregate code to the plurality of load identifiers sent from the first mobile device.

In a third aspect, method for inter-application data communication is disclosed. The method comprises, by a printer, printing a plurality of codes corresponding to a plurality of identifiers, the plurality of identifiers being associated with a plurality of loads; by a first processor of a first mobile device, sending the plurality of identifiers to a backend platform; by a second processor of a second mobile device, receiving the plurality of identifiers from the backend platform; by the second processor, scanning, using a second scanner of the second mobile device, the plurality of codes, wherein the plurality of codes are affixed to the plurality of loads; by the second processor, generating an aggregate code corresponding to the plurality of codes; by the second processor, displaying the aggregate code on a screen of the second mobile device; by the first processor, scanning, using a first scanner of the first mobile device, the aggregate code displayed on the screen of the second mobile device; by the first processor, parsing the aggregate code to determine a plurality of identifiers ingested by the second mobile device; and by the first processor, comparing the plurality of identifiers ingested by the second mobile device to a plurality of expected identifiers.

DETAILED DESCRIPTION

Figure 1:
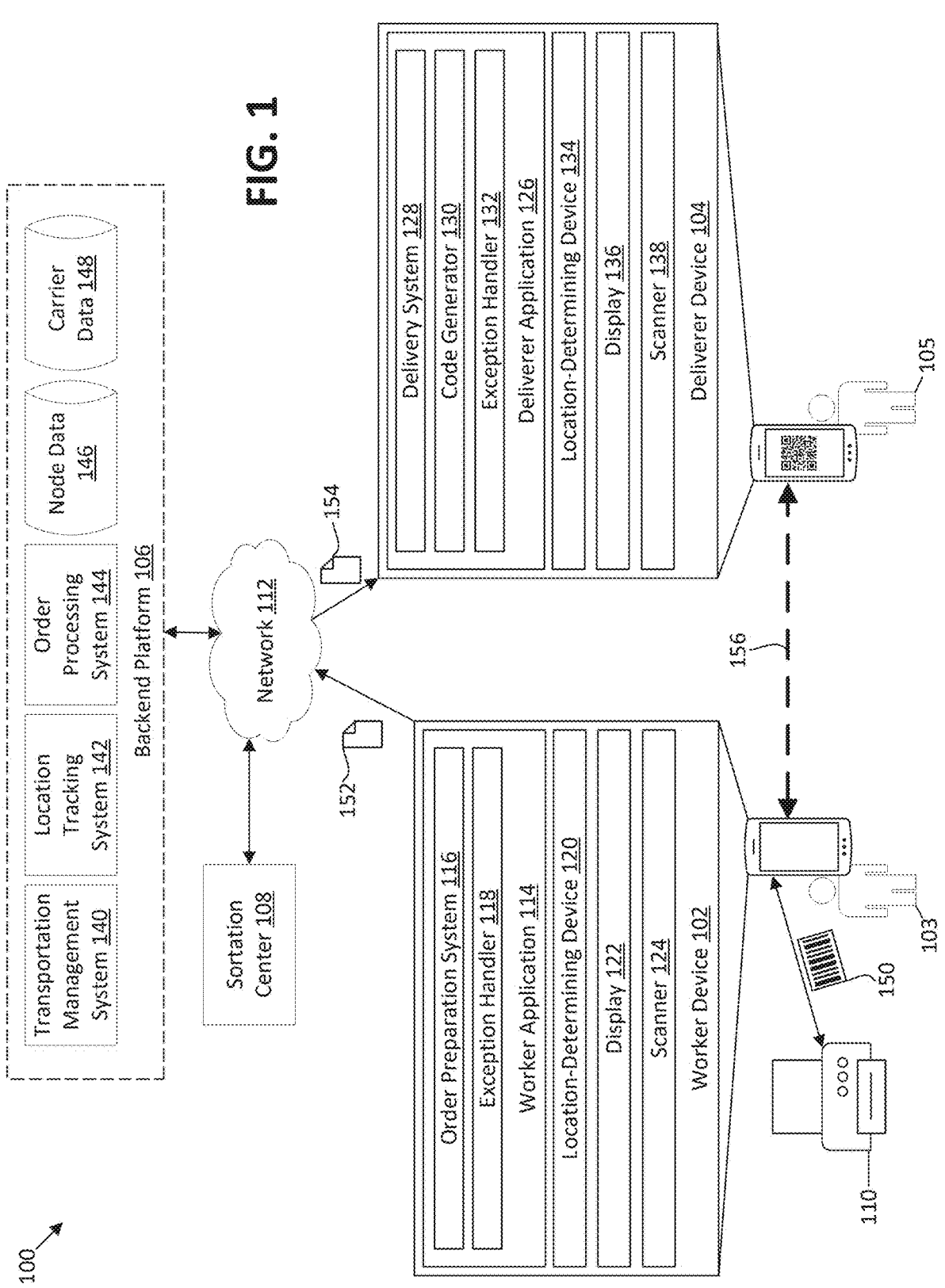
FIG. 1 illustrates an example network environment in which aspects of the present disclosure may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In example aspects, a system for inter-application data communication is disclosed. In some embodiments, the system includes a worker application and a deliverer application. The worker application may be used to prepare loads of packages. The deliverer application may be used to deliverer the loads of packages. The worker application and the deliverer application may communicate with one another using techniques described herein, which may include, for example, an optical code-scanning technique for ensuring that data associated with the worker application is accurately and efficiently ingested by the deliverer application.

In example aspects, a worker at a node of a logistics network, such as a warehouse or store, may use the worker application to prepare loads, or pallets, of packages. The worker application may be communicatively coupled with a printer, which may likewise be located at the node. In some embodiments, when a worker creates a load, the load may be associated with an identifier, such as an alphanumeric string. The printer may print a code that encodes or is otherwise associated with the identifier of the load. The code may be for example, a bar code or QR code. The code may be affixed to the load, such as by the worker or an automated robotic system. In some embodiments, the worker application may provide, among other data, identifiers associated with loads to a backend computing platform.

In example aspects, a deliverer may arrive at the node to pick up loads. The deliverer application may receive, from the backend platform, codes or identifiers corresponding to loads that are to be picked up from the node during a stop. At the node, the deliverer application may scan codes affixed to available loads that are picked up by the deliverer. The deliverer application may generate an aggregate code, which may be a QR code, that corresponds to the codes scanned by the deliverer application. The aggregate code may encode the identifiers associated with the ingested codes. In some embodiments, the aggregate code is displayed on a screen of the deliverer device.

In example aspects, the worker application may scan the aggregate code displayed on the screen of the deliverer device. The worker application may parse the aggregate code to determine identifiers that were ingested by the deliverer application. The worker application may compare the identifiers ingested by the deliverer application with identifiers associated with expected identifiers, which may correspond to loads scheduled to be transferred to the deliverer. If there is a match, it may be determined that the deliverer application successfully ingested each of the expected identifiers, and therefore the deliverer picked up each of the expected loads. In some embodiments, if the identifiers do not match, a reconciliation process may be performed by one or more of the worker application or deliverer application.

Aspects of the present disclosure provide various technical advantages. For example, aspects of the present disclosure increase the likelihood that the deliverer application ingests all expected identifiers, thereby increasing the percentage of successful data exchanges between the worker application and deliverer application, thereby resulting in data records of different computing systems that are more consistent with one another. Yet still, in some embodiments, the worker application may flexibly define the quantity and content of loads. For example, depending on conditions at the node, such as a throughput capacity or a number of packages to be shipped, the worker application may select a number of loads to create for a given time period, such as a day. Moreover, the worker application can add or remove packages to the load, even after the code for the load is printed, and even if a deliverer is in transit to the node. Furthermore, the deliverer application may receive real-time updates regarding the loads and identifiers created by the worker application, which may include identifiers that may be expected to be ingested by the deliverer application upon arriving at the node. As such, aspects of the present disclosure enable ad-hoc, real-time adjustments to loads and their content while still maintaining an accurate and efficient exchange of data corresponding to a handoff of identifiers from the worker application to the deliverer application.

Yet still, in some embodiments, the system described herein may use automated real-time location-based notifications. For example, based on data from a location-determining device of the deliverer device, it may be determined that the deliverer device arrives at a node, and the worker application may receive a notification of the arrival, thereby instructing the worker to meet the deliverer to perform aspects of the optical data exchange described herein.

Yet still, in some embodiments, aspects of the present disclosure provide real-time tracking of deliverer capacity. For example, because the deliverer application reliable ingests all expected identifiers, a real-time available capacity of the deliverer may be determined by comparing sizes of loads associated with the ingested identifiers to a size of a vehicle of the deliverer. Based on the determination of deliverer capacity, the deliverer application or the backend platform may, for example, reroute the deliverer, adjust schedules of other deliverers, or perform other operations. Yet still, in some embodiments, aspects of the present disclosure improve performance in a logistics network more generally. For example, aspects of the present disclosure have been shown to reduce the percentage of loads that were not received as expected across portions of the logistics network from around 7% to 4%. Additionally, by using code scanning technology, aspects of the present disclosure may successfully be ported to different computing platforms and applications without having to create or edit application communication protocols. As will be apparent to those having skill in the art, these are only some of the benefits, advantages, and improvements that may be provided by features of the present disclosure.

FIG. 1 illustrates a network environment 100 in which aspects of the present disclosure may be implemented. In the example of FIG. 1, the network environment 100 includes a worker device 102, a deliverer device 104, a backend platform 106, a sortation center 108, a printer 110, and a network 112. In some embodiments, components of the network environment 100 may perform processes and operations described herein. The example of FIG. 1 also illustrates example data exchanges 150-156 between components of the environment 100.

In some embodiments, one or more components of the network environment 100 may be part of an information system associated with an entity. The information system may include a collection of software, hardware, networks, and data. The entity associated with the information system may be a particular organization or group of organizations. For example, the organization may use, develop, maintain, own, or otherwise be associated with one or more components of the information system. In some embodiments, the organization is a logistics company. In some embodiments, the organization is a retailer. In some embodiments, one or more of the components of the environment 100 may be associated with a third-party relative to the organization. As an example, the deliverer device 104 may be associated with a third-party carrier organization that transports packages from a node associated with the worker device 102 to the sortation center 108.

In some embodiments, components of the network environment 100 are part of a logistics or supply chain network. As an example, a node associated with the worker device 102 and the sortation center 108 may belong to a common logistics network of an entity and may both be owned by the entity. Example aspects of such a logistics network, or supply chain network, including systems and operations described in association therewith, are described in U.S. Pat. No. 12,001,994, entitled "DELIVERY MANAGEMENT PLATFORM AND MOBILE APPLICATION," the disclosure of which is hereby incorporated by reference in its entirety.

The worker device 102 may be a computing system that includes a combination of hardware and software. In some embodiments, the worker device 102 is a mobile device. For example, the worker device 102 may be mobile phone, a tablet, a laptop, a handheld inventory tracking and management device, or another device. In some embodiments, the worker device 102 is a combination of devices that may be communicatively coupled to one another. In the example shown, the worker device 102 includes a worker application 114, location-determining device 120, a display 122, and a scanner 124. In some embodiments, worker device 102 is associated with a worker 103.

The worker 103 may be a person or machine that operates the worker device 102. In some embodiments, the worker 103 is located at a node in a logistics network. In some embodiments, the printer 110 may likewise be located at the node. The node may be a location at which one or more of receiving, processing, or shipping items takes place. In some embodiments, the node is a retail store that sells items and is also an origin point from which items are shipped. In some embodiments, the node is a warehouse or an inventory processing facility.

The worker application 114 may be a software application that is used by the worker device 102. Depending on the embodiments, the worker application 114 may be a native application, web application, or hybrid application. In some embodiments, different instances of the worker application 114 may be installed on different worker devices. In some embodiments, the worker application 114 performs operations associated with items that are processed at the node at which the worker device 102 is located. In some embodiments, the worker application 114 can access other components of the worker device 102, such as the location-determining device 120, the display 122, or the scanner 124. In some embodiments, the worker application 114 may include subcomponents for performing certain operations. In the example of FIG. 1, the worker application 114 includes an order preparation system 116 and an exception handler 118. Example operations that may be performed by the worker application 114 in some embodiments are described in connection with FIGS. 3-4. Example user interfaces of the worker application 114 are illustrated in connection with FIGS. 7-10.

The order preparation system 116 may perform operations related to preparing orders to ship. In some embodiments, the order preparation system 116 may receive indications of items that are to be shipped. In some embodiments, the order preparation system 116 may include features for performing, or for assisting the worker 103 to perform, one or more of the following: picking items, such as from a shelf or other storage location; packing items in packages, either individually or with items that may share a final destination; sorting items or packages; creating codes for packages; affixing codes to packages; creating loads; adding packages or items to loads; creating codes for loads; affixing codes to loads; preparing items to ship; communicating with one or more of the deliverer device 104, the backend platform 106, or the printer 110; or performing other operations.

The exception handler 118 may perform operations related to reconciling a mismatch of identifiers with the deliverer application 126. In some embodiments, the exception handler 118 may receive an exception from the worker 103 to override a mismatch of identifiers. In some embodiments, the exception handler 118 may automatically generate an exception in response to a mismatch between identifiers.

The location-determining device 120 may be a device for determining a location of a device, such as the worker device 102, or for generating data that may be used to determine the location of a device. Depending on the embodiment, different location-sensing technology may be used. For example, the location-determining device 120 may include a global positioning system (GPS) device, such as a GPS receiver. In some embodiments, the location-determining device 120 may use network connectivity data, such as a Wi-Fi, Bluetooth, or cellular network data, as part of determining a location of the location-determining device 120.

The display 122 may be a device for displaying or outputting data of a device, such as the worker device 102. In some embodiments, the display 122 is a screen of the worker device 102.

The scanner 124 may be a device for scanning a code. In some embodiments, the scanner 124 includes a camera that may capture optical or visual data. In some embodiments, the scanner 124 includes a laser. In some embodiments, the scanner 124 includes computer vision software for analyzing a scanned code. For example, the scanner 124 may extract data from a scanned code, such as an alphanumeric string encoded by the code. In some embodiments, the scanner 124 includes a trained machine learning model for identifying a code and extracting information from a code. In some embodiments, the scanner 124 may scan a code affixed to a package or load, or a code displayed by a screen of a device, such as the deliverer device 104. Examples of codes that may be scanned by the scanner 124 are described further in connection with FIG. 2.

The deliverer device 104 may be a computing system operated by the deliverer 105. The deliverer device 104 may have one or more of the characteristics described in connection with the worker device 102. In the example shown, the deliverer device 104 includes a deliverer application 126, a location-determining device 134, a display 136, and a scanner 138, which may have one or more of the characteristics described in connection with the location-determining device 120, the display 122, and the scanner 124, respectively. However, in some embodiments, one or more features of the worker device 102 and the deliverer device 104 may differ. For example, whereas the worker device 102 may use one scanner type or location-determining device, the deliverer device 104 may use a different scanner type or location-determining device.

The deliverer 105 may be a person that uses the deliverer device 104 as part of transporting items. In some embodiments, the deliverer 105 belongs to a carrier organization. In some embodiments, the deliverer 105 is a person or group of people. In some embodiments, the deliverer 105 is a robot or autonomous vehicle.

The deliverer application 126 may be a software application that is used by the deliverer device 104. Depending on the embodiments, the deliverer application 126 may be a native application, web application, or hybrid application. In some embodiments, different instances of the deliverer application 126 may be installed on different deliverer devices. In some embodiments, the deliverer application 126 performs operations associated with transporting items from an origin node to a destination node, such as transporting items from a node associated with the worker device 102 to the sortation center 108. In some embodiments, each of deliverer application 126 and the worker application 114 are developed by a common entity, but the deliverer application 126 is used by a third-party entity to transport items of the common entity between nodes of the common entity.

In some embodiments, the deliverer application 126 can access other components of the deliverer device 104, such as the location-determining device 134, the display 136, or the scanner 138. In some embodiments, the deliverer application 126 may include subcomponents for performing certain operations. For example, in the example of FIG. 1, the deliverer application 126 includes a delivery system 128, code generator 130, and exception handler 132. Example operations that may be performed by the deliverer application 126 in some embodiments are described in connection with FIGS. 3 and 5. Example user interface of the deliverer application 126 are illustrated in connection with FIGS. 7-10. Example aspects of an embodiment of the deliverer application 126 are described in connection with the mobile application of U.S. Pat. No. 12,001,994, the disclosure of which is hereby incorporated by reference in its entirety.

The backend platform 106 may be a computing system that, among other things, facilitates the transportation of items, processes orders, manages data associated with a logistics network, and performs one or more other operations associated with a logistics or retail entity. Some components of the backend platform 106 may operate in a common computing environment. Some components of the backend platform 106 may operate in different computing environments and communicate over a network, such as the internet or a local network. Some components of the backend platform 106 may be developed and maintained by a third-party. Example aspects of an embodiments of the backend platform 106 are described in connection with the delivery management platform of U.S. Pat. No. 12,001,994. In the example shown, the backend platform 106 includes a transportation management system 140, a location tracking system 142, an order processing system 144, node data 146, and carrier data 148.

The transportation management system 140 may facilitate the transportation of items. In the example of FIG. 1, transportation management system 140 may facilitate the transportation of items from the node associated with the worker device 102 to the sortation center 108. The transportation management system 140 may exchange data with one or more of the worker device 102 or the deliverer device 104, which may include exchanging data with one or more of the worker application 114 or the deliverer application 126.

In some embodiments, the transportation management system 140 may perform one or more of the following operations, or operations that are associated with one or more of the following operations: determining origin and destination nodes for packages or loads; determining delivery schedules; determining delivery routes; managing interactions with carrier entities, including selecting carriers to deliver given loads, and including interacting with carrier deliverers and dispatchers; receiving and routing real-time delivery updates, such as receiving a location event from the deliverer device 104 and, in response, pushing data to the worker device 102; determining an available capacity of carriers and, if necessary, generating ad-hoc, real-time adjustments to carrier assignments or routes based on carrier capacity; receiving load identifiers and other data from worker devices; providing load identifiers and other data to deliverer devices; providing real-time updates to sortation centers, such as an identification and characteristics of loads picked up by a deliverer and in transit to a sortation center; and performing other operations.

The location tracking system 142 may track locations of devices communicatively coupled with the backend platform 106. For example, the location tracking system 142 may track locations of deliverer devices, so that the backend platform 106 may provide real-time notifications of deliverer location status to worker devices or sortation centers.

The order processing system 144 may perform operations related to processing orders. In some embodiments, the order processing system 144 includes a digital retail system, which may include, for example, a retail website or other application via which a customer may purchase items. In some embodiments, the order processing system 144 may automatically determine an origin node from which to fulfill a customer order. The origin node may be the node at which worker devices, such as the worker device 102, are located. In some embodiments, the order processing system 144 may receive or determine shipping times, which may be a time by which an order is to be provided to a customer. In some embodiments, the order processing system 144 may provide real-time updates to a customer regarding a location of items of an order. As an example, upon receiving an indication from one or more of the worker device 102 or the deliverer device 104 that the deliverer device 104 has ingested identifier associated with a load that includes items of an order of a given customer, the order processing system 144 may provide a real-time update (e.g., via a push notification, an email, or delivery status feature) to the customer that the order has been passed to the deliverer 105. Likewise, the order processing system 144 may provide a real-time update to the customer when the deliverer 105 arrives at the sortation center 108.

The node data 146 may include data associated with nodes of a logistics network associated with components of the environment 100. For a given node, the node data 146 may include, but need not include, and is not limited to including, the following data: geographical coordinates of the node; inventory data of the data; a node type, such as whether the node is a store, sortation center, warehouse, third-party location, or other node type; a node throughput;

a node capacity; node worker data; carrier organizations associated with a node; or other data associated with a node.

The carrier data 148 may include data associated with carriers that transport data between nodes. A carrier may include one or more deliverers. The carrier data 148 may include, for a given carrier, nodes associated with the carrier, which may be the nodes from which carriers pick up items and nodes at which carriers drop off items. The carrier data 148 may include one or more of availability or capacity of deliverers of a carrier. The carrier data 148 may include events received from deliverers or dispatchers of a carrier.

The sortation center 108 may be a physical location that receive items from other nodes, such as stores, and that consolidates and sorts these items for efficient delivery to their next locations. In some instances, the sortation center 108 is the last stop of an item prior to delivery to a final destination. At the sortation center 108, products may be sorted for the last leg of the delivery, which may be from the sortation center 108 to a customer's residence. Sorting products at the sortation center 108 can improve the efficiency of the last leg of the delivery. For example, products can be grouped based on the geographic proximity of their final destination, based on their delivery date or time, based on the type of vehicle that will deliver them, or based on sorting algorithms. Furthermore, by receiving products from many stores, sortation center 108 may have a greater quantity and diversity of inventory than is available in a store. In some embodiments, the sortation center 108 receives updates from the backend platform 106 regarding incoming items, and as such, may be prepared, such as by automated adjustment and positioning of processing machinery and storage space, to receive the quantity and contents of the incoming shipments. Advantageously, in some embodiments, because aspects of the present disclosure enable the deliverer application 126 to reliably ingest identifiers, and for the successfully ingested identifiers of loads to be relayed to the sortation center 108, the sortation center 108 can more precisely prepare to receive incoming shipments, because the sortation center 108 may know with certainty the identification, quantity, and contents of loads picked up by the deliverer 105 and in route to the sortation center 108.

The printer 110 may be a device that, among other things, transfers data to paper and outputs the paper. Depending on the embodiment and the hardware of the printer 110, different printing techniques may be used. For example, the printer 110 may use one or more of thermal printing, inkjet printing, or laser printing. In some embodiments, the printer 110 includes a computing system that may, among other things, receive data from other computing devices, such as the worker device 102 or the backend platform 106, process the data, and generate data to output onto the paper based on the processed data. As an example, the printer 110 may receive data from the worker device 102 corresponding to loads. In some embodiments, the data may simply be a number of loads to be created, in which case the printer 110 may determine unique identifiers for the loads. In some embodiments, the data may include the identifiers for the loads to be created. In some embodiments, the printer 110 may convert identifiers received form the worker device 102 into different identifiers. For each identifier, the printer 110 may print a code that encodes the identifier. The code may be, for example, a bar code, QR code, or other type of code. Moreover, in some embodiments, the printer 110 may print the identifier itself, and in some embodiments, the printer 110 may print data associated with the identifier, such details of the load corresponding to the identifier, such as shipping data or data related to the items or packages belonging to the load.

In some embodiments, the printer 110 is located at the same node at which the worker device 102 is located. In some embodiments, the printer 110 is communicatively connected to the worker device 102 via a local network encompassing areas of the node. In some embodiments, the printer 110 is a system of devices, which may include, for example, network interfaces, one or more printing devices, printer software, displays, machinery for affixing codes to loads or packages, and other components. In some embodiments, the printer 110 is an automated system, such that the printer 110 automatically receives data from the worker device 102, and in response to receiving such data, automatically prints the codes and may affix the codes to packages or loads.

The network 112 may communicatively couple components of the environment 100. In some embodiments, some components that are part of the environment 100 are communicatively coupled with one another via the network 112. The network 112 may be, for example, a wireless network, a wired network, a virtual network, the internet, or another type of network. Furthermore, the network 112 may include subnetworks, and the subnetworks may be different types of networks or the same type of network.

The elements 150-156 illustrate example data exchanges between components of the environment 100.

With reference to element 150, the printer 110 may exchange data with one or more of the worker device 102 or the worker 103. This data exchange may include, for example, an exchange of identifiers associated with loads and a printing of codes corresponding to the identifiers. As an example, the worker application 114 may receive, from the worker 103, a number of loads to create for shipping items to be delivered during a given day. The worker application 114 or the printer 110 may generate sufficiently unique (e.g., unique for a given day, week, location, etc.) identifiers for each load. The identifiers may be communicated to the printer 110. The printer 110 may print codes corresponding to each identifier, the codes may be retrieved by the worker device 102 or worker 103, and the codes may be affixed by the worker device 102 or the worker 103 onto loads.

With reference to element 152, the worker device 102 may send identifiers associated with loads to the backend platform 106. For example, the worker application 114 may use a network interface component of the worker device 102 to communicate identifiers to the backend platform 106. The identifiers may include, but may not be limited to, the identifiers associated with the codes printed by the printer 110. Moreover, the worker application 114 may provide additional data to the backend platform 106. In some instances, by providing identifiers to the backend platform 106, the worker application 114 may provide a number and identity of loads to be shipped from a location of the worker device 102.

With reference to element 154, the deliverer device 104 may receive identifiers associated with loads from the backend platform 106. For example, the deliverer application 126 may use a network interface component of the deliverer device 104 to receive identifiers from the backend platform 106. In some embodiments, the backend platform 106 may have determined that the deliverer device 104 is associated with an entity, such as a deliverer or carrier, to transport loads associated with the identifiers, and as such, the backend platform 106 may send the identifiers to the deliverer device 104 from among a plurality of possible deliverer devices. The deliverer application 126 may present the identifiers to the deliverer 105. In some embodiments, the deliverer application 126 may also present data associated with the identifiers to the deliverer 105, such as a node from which the nodes corresponding to the identifiers are to be picked up, a location of the node at which the loads are to be picked up, a time at which the loads are to be picked up, and other data that may be associated with the identifiers.

With reference to the element 156, the worker application 114 and deliverer application 126 may perform an optical data exchange. For example, the deliverer application 126 may display an aggregate code on the display 136 of the deliverer device 104, and the worker device 102 may use the scanner 124 of the worker device 102 to scan the aggregate code. Prior to displaying the aggregate code, the deliverer application 126 may have scanned a plurality of codes affixed to loads that correspond to identifiers received by the deliverer device 104, and based on the ingested codes, the deliverer application 126 may have generated the aggregate code. By optically scanning the aggregate code, the worker application 114 and deliverer application 126 may perform a data synchronization operation to ensure that the deliverer application 126 ingested each identifier that the worker application 114 expected the deliverer application 126 to ingest, which may include the identifiers generated by the worker application 114 corresponding to the loads to be shipped. With further reference to the element 156, the worker application 114 and the deliverer application 126 may perform a reconciliation process to address any mismatch between the identifiers ingested by the deliverer application 126 and the identifiers that were expected to be ingested by the deliverer application 126. Additional and exemplary aspects of the data exchanges 150-156 are further described herein.

Although aspects of FIG. 1 are described in connection with the worker device 102 and node associated with the worker device 102, the deliverer device 104, sortation center 108, and printer 110, aspects of the present disclosure may be implemented across a plurality of worker devices, a plurality of nodes, a plurality of deliverer devices, a plurality of printers, and a plurality of nodes. Moreover, the environment 100 may include more or fewer components than set forth in the example of FIG. 1.

Figure 2:
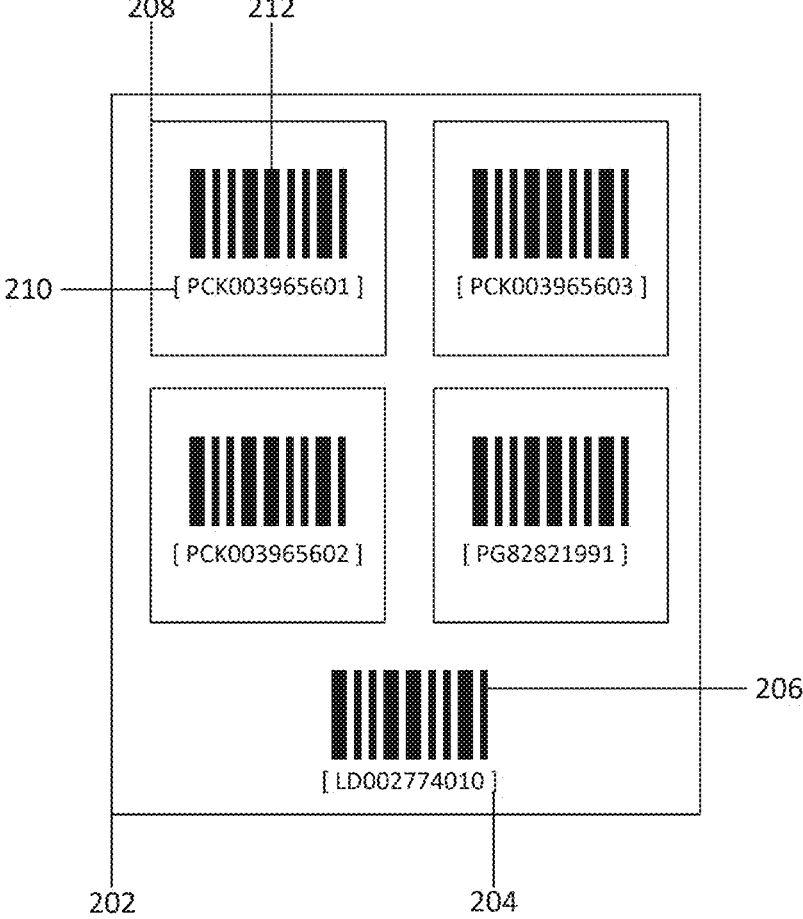
FIG. 2 illustrates a schematic diagram of a load, packages, identifiers, and codes.

FIG. 2 illustrates a schematic diagram of an example load 202. The load 202 may include a plurality of packages. For instance, in the example of FIG. 2, the load 202 includes four packages, including the example package 208. In some embodiments, the load 202 is a physical object that contains packages, such as a pallet, a crate, a bag, a container, or other object. The load 202 may be associated with an identifier 204 and a code 206. In some embodiments, one or more of the identifier 204 or the code 206 may be affixed to the load, such as by using an adhesive material.

The load identifier 204 may be data that identifies the load. The load identifier 204 may be an alphanumeric string. In some embodiments, the load identifier 204 is a unique identifier. The load identifier 204 may be encoded by, or may be derived from, data that is encoded by, the code 206. In some embodiments, the load identifier 204 itself is not affixed to the load 202.

The code 206 may be data, such as a bar code or QR code, that encodes the identifier 204 or data from which identifier 204 may be derived by a computing system. The code 206 may be printed by the printer 110. Although illustrated as a visual code in the example of FIG. 2, the code 206 may be a different type of code. Although certain codes described herein are visual codes, aspects of the present disclosure are not limited to visual codes. For instance, in some embodiments, one or more of the bar codes or QR codes described herein may be replaced by one or more of a radio frequency identification (RFID) tag, and the computing devices described herein may include devices for reading RFID tags to determine identifiers. Other techniques for identifying and tracking items are likewise possible.

The package 208 may include one or more items. The package 208 may be packed by the worker 103 for delivery to a customer that ordered the one or more items. In some embodiments, the package 208 is a physical object, such as cardboard, a bag, or other container that includes the one or more items. The package 208 may be associated with a package identifier 210 and a package code 212, which may include one or more of the features described in connection with the identifier 204 and code 206, respectively, except that, whereas the identifier 204 and code 206 correspond to the load 202, the package identifier 210 and the package code 212 may correspond to a particular package of the load 202. Each of the packages of the load 202 may include different items, identifiers, and codes, and the worker application 114 may add a package to the load 202 by associating the package identifier 210 with the load identifier 204, such as by scanning codes corresponding to the load and package or by receiving an instruction to associate the package identifier 210 with the load identifier 204.

Figure 3:
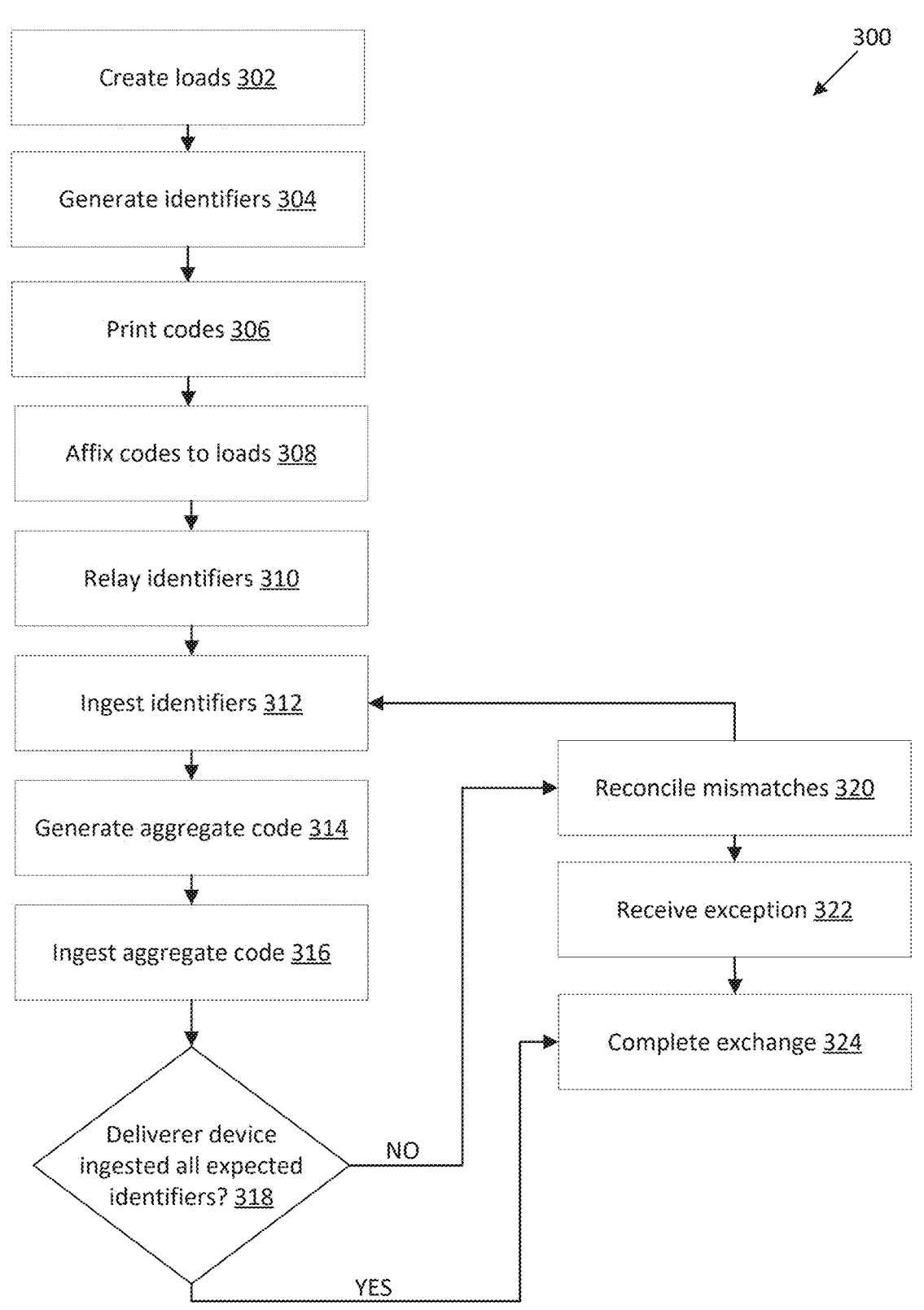
FIG. 3 is a flowchart of an example method according to aspects of the present disclosure.

FIG. 3 is a flowchart of an example method 300 for performing aspects of an inter-application data communication method. As described herein, different components perform different operations of the method 300.

In the example shown, the worker application 114 may create loads (step 302). For example, the worker application 114 may create a sufficient number of loads to accommodate packages to be shipped from a node associated with the worker device 102. In some embodiments, the worker application 114 may include one or more input fields via which the worker 103 may input a number of loads to create and one or more other characteristics of the loads. Furthermore, the worker application 114 may add packages to loads. To do so, the worker application 114 may associate a package identifier with a load identifier. In some embodiments, the worker application 114 may use the scanner 124 of the worker device 102 to scan each of a package identifier and a load identifier of a load to which the package is to be added. In some embodiments, packages may be automatically assigned to loads. In some embodiments, each package associated with a load may be physical placed by one or more of the worker device 102 or the worker 103 into a container of the load. In some embodiments, creating a load may be a multi-part process, which may include, for example, picking items, packing items, and sorting packaged items in a load. In some embodiments, creating loads may be an ongoing process, such that, even after codes have been printed and even after a load has been assigned to a deliverer, the worker application 114 may continue to add or remove packages to loads.

In the example shown, the worker application 114 may generate identifiers for loads (step 304). Example aspects of load identifiers are described in connection with FIG. 2. In some embodiments, the worker application 114 randomly assigns unique identifiers to loads. In some embodiments, the worker 103 may manually input identifiers. The worker application 114 may provide the identifiers to the printer 110 for printing of codes corresponding to the identifiers. In some embodiments, the printer 110 itself may generate identifiers.

In the example shown, the printer 110 may print codes corresponding to the identifiers (step 306). For example, the printer 110 may receive or generate identifiers and then for each identifier, generate data, such as a code, that may be printed on paper. The printer 110 may then print the codes.

In the example shown, the printed codes may be affixed to the loads (step 308). In some embodiments, the worker 103 may retrieve printed codes form the printer 110 and affix the codes to a physical portion of the loads. In some embodiments, the printer 110 may include a component for affixing codes to loads.

In the example shown, the identifiers of the loads may be relayed to the deliverer device 104 (step 310). In some embodiments, the worker device 102 may provide the identifiers to the backend platform 106, which may provide the identifiers to the deliverer device 104. In some embodiments, the backend platform 106 may alter the identifiers, such as to a format used by one or more of the backend platform 106 or the deliverer application 126, prior to sending the reformatted identifiers to the deliverer application 126. In some embodiments, the backend platform 106 may lookup that the deliverer device 104 is to transport items from a node associated with the worker device 102. The deliverer application 126 may present the received identifiers to the deliverer 105, such as by displaying the identifiers on a screen of the deliverer device 104.

In the example shown, the deliverer application 126 may ingest identifiers of loads (step 312). For example, the deliverer application 126 may use the scanner 138 of the deliverer device 104 to scan codes affixed to loads. The deliverer application 126 may analyze a scanned code. By analyzing the scanned code, the deliverer application 126 may determine an identifier associated with the load associated with the code. In some embodiments, the deliverer application 126 may scan all load codes that are available at a location of a node. For example, the deliverer application 126 may scan codes of loads that are located at a designated pickup location. In some embodiments, the deliverer application 126 may ingest identifiers by other means, in addition to or instead of scanning codes associated with identifiers. For example, in some embodiments, the deliverer application 126 may include input fields for receiving manually input identifiers.

In the example shown, the deliverer application 126 may generate an aggregate code (step 314). For example, the deliverer application 126 may create a QR code that encodes a list of identifiers ingested by the deliverer application 126. In some embodiments, the deliverer application 126 provides the QR code to the worker application 114. For example, the deliverer application 126 may display the QR code on a display of the deliverer device 104.

In the example shown, the worker application 114 may ingest the aggregate code (step 316). For example, the worker application 114 may use the scanner 124 of the worker device 102 to scan the aggregate code displayed on the deliverer device 104. In some embodiments, the worker application 114 may receive a manual input of the aggregate code.

In the example shown, it may be determined whether the deliverer device ingested all expected identifiers (step 318). For example, from the scanned aggregate code, the worker application 114 may determine one or more identifiers ingested by the deliverer application 126. For example, the aggregate code may include a list of identifiers, such as a CSV file with a list of identifiers, and the worker application 114 may parse the list to determine the list of identifiers encoded by the aggregate code, which may be the list of identifiers ingested by the deliverer application 126. The worker application 114 may compare the one or more identifiers ingested by the deliverer application 126 to a list of expected identifiers.

The list of expected identifiers may be one or more identifiers corresponding to loads that are to be picked up by the deliverer 105. In some embodiments, the worker application 114 determines the list of expected identifiers. In some embodiments, the worker application 114 automatically determines the list of expected identifiers based at least in part on a shipment schedule associated with loads at a node of the worker device 102. In some embodiments, the list of expected identifiers includes the one or more identifiers generated by the worker application 114 as part of creating loads (e.g., in connection with the operations 302 and 304) or by one or more other worker devices at the node of the worker device 102. In some embodiments, the list of expected identifiers includes one or more identifiers selected by the worker application 114 to ship from the node at a given time. For example, the worker application 114 may scan one or more codes associated with one or more loads to be shipped from the node, and one or more identifiers associated with the one or more codes may be the list of expected identifiers. In some embodiments, the worker application 114 may receive a list of expected identifiers from an external application, such as, for example, the backend platform 106.

In response to determining that the identifiers ingested by the deliverer application 126 includes each of the expected identifiers (e.g., taking the "YES" branch), the method 300 may proceed to the step 324. In response to determining that there is a mismatch between the identifiers ingested by the deliverer application 126 and the expected identifiers (e.g., taking the "NO" branch), the method 300 may proceed to the step 320. In some embodiments, the worker application 114 may use a different technique for determining whether the deliverer application ingested all identifiers.

In the example shown, one or more of the worker application 114 or the deliverer application 126 may reconcile a mismatch between identifiers ingested by the deliverer application 126 and the identifiers that the worker application 114 expected the deliverer application 126 to ingest (step 320). In some embodiments, the mismatch may be caused by the presence of an expected identifier that is not matched with any identifiers ingested by the deliverer application 126. In some embodiments, the mismatch may be caused by the deliverer application 126 ingesting an identifier that is not present in the list of expected identifiers. There may be various techniques for resolving mismatched identifiers. In some instances, the deliverer application may ingest an additional identifier that may correspond to a missing identifier, thereby returning to the step 312 of the method 300. In some instances, one or more of the worker application 114 or the deliverer application 126 may receive or generate an exception (thereby proceeding to the step 322), which may override the mismatch.

In the example shown, one or more of the worker application 114 or the deliverer application 126 may receive an exception. For example, one or more of the worker application 114 or the deliverer application 126 may receive, via an input field of a graphical user interface, a selection of one or more exceptions from the worker 103 or the deliverer 105, respectively. The exception may indicate a reason for which identifiers ingested by the deliverer application 126 did not match the identifier expected by the worker application 114. Example exceptions may correspond to one or more of the following: a deliverer device issue; a worker device issue; a code issue, such as a load that lacks a code or that has a code that cannot be scanned; a load or package issue, such as a missing or inaccessible load or package; a worker unavailable issue; a deliverer unavailable issue; a deliverer capacity issue, such as the deliverer not having space for a given load; a deliverer refusal to accept a load; an extra load issue; a custom-defined issue; or another issue.

In the example shown, one or more of the worker application 114 or the deliverer application 126 may complete a data exchange (step 324). For example, after a confirmation that the identifiers ingested by the deliverer application 126 match a list of expected identifiers, or after performing a reconciliation process, one or more of the worker application 114 or the deliverer application 126 may determine that the data exchange is completed and that deliverer application 126 ingested the identifiers corresponding to loads to be transported by the deliverer 105. In some instances, the deliverer 105 may then depart with the loads corresponding to the ingested identifiers from the node associated with the worker device.

In some embodiments, one or more of the worker application 114 or the deliverer application 126 may provide, among other data, the list of identifiers ingested by the worker application 114 to the backend platform 106. The backend platform 106 may, in some embodiments, automatically provide the list of ingested identifiers, or data corresponding to the list of ingested identifiers, to a computing system of the sortation center 108. As such, the computing system of the sortation center 108 may prepare for incoming loads and their corresponding packages. In some embodiments, the backend platform 106 may automatically update a package tracking system based on the load identifiers received from the one or more of the worker application 114 or the deliverer application 126.

Figure 4:
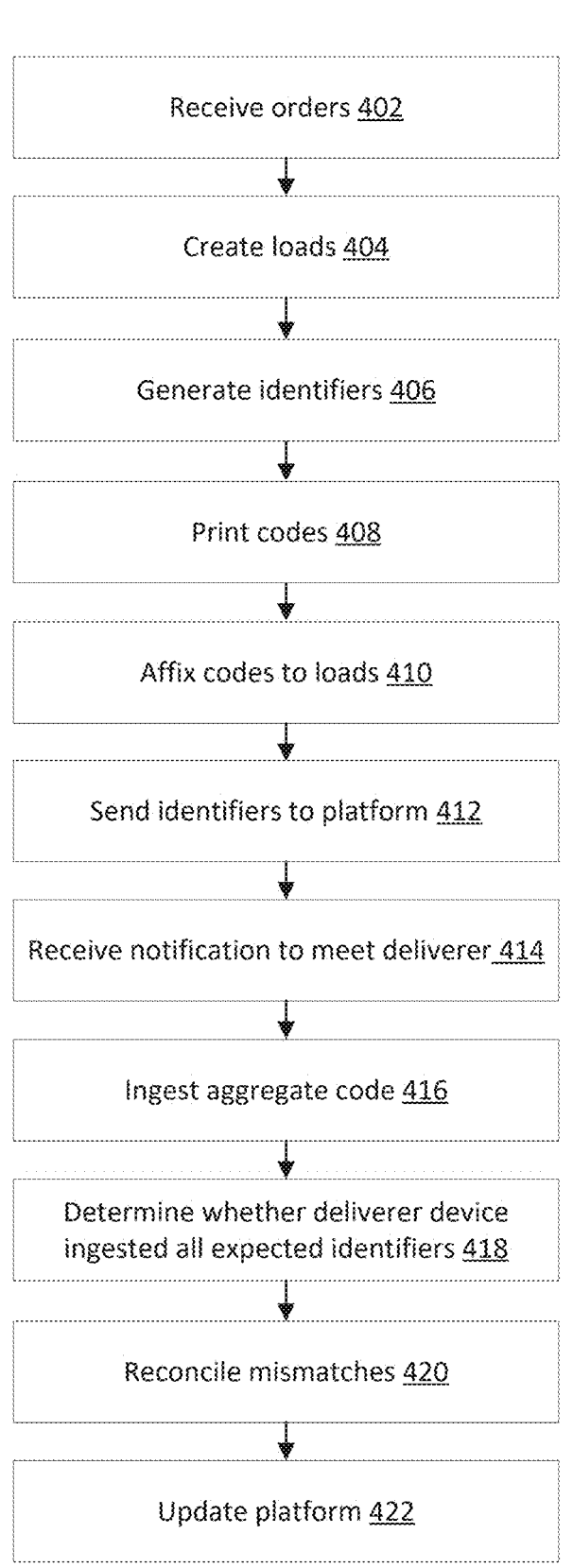
FIG. 4 is a flowchart of an example method according to aspects of the present disclosure.

FIG. 4 is a flowchart of an example method 400 that may be performed by the worker device 102, the worker 103, the worker application 114, the printer 110, or a combination thereof.

In the example shown, the worker application 114 may receive orders (step 402). For example, the worker application 114 may receive, from the backend platform 106, a plurality of orders, each of which may include one or more items, that are to be shipped from a node associated with the worker device 102. In some embodiments, the worker application 114 may also receive a schedule associated with the plurality of orders.

In the example shown, the worker application 114 may create loads (step 404), example aspects of which are described in connection with the step 302 of FIG. 3.

In the example shown, one or more of the worker application 114 or the printer 110 may generate identifiers for the loads (step 406), example aspects of which are described in connection with the step 304 of FIG. 3.

In the example shown, the printer 110 may print codes (step 408), example aspects of which are described in connection with the step 306 of FIG. 3.

In the example shown, one or more of the worker device 102, the worker 103, or the printer 110 may affix codes to loads (step 410), example aspects of which are described in connection with the step 308 of FIG. 3.

In the example shown, the worker application 114 may send identifiers to the backend platform 106 (step 412), example aspects of which are described in connection with the step 310 of FIG. 3. For example, the worker application 114 may send identifiers generated at the step 406 to a component of the backend platform 106 that is communicatively coupled with one or more of the deliverer application 126 or the sortation center 108.

In the example shown, the worker application 114 may receive a notification to meet the deliverer 105 (step 414). For example, the worker application 114 may be configured to receive updates regarding a location of the deliverer device 104. In some embodiments, the worker application 114 receives a notification that the deliverer device has arrived or is about to arrive at a node at which the worker device 102 is located. In some embodiments, the notification may be displayed as a push notification on a screen of the worker device 102. In some embodiments, the notification may include additional information, such as identifiers of loads or packages to be picked up by the deliverer, information of the deliverer, an estimated arrival time, or a specific location at which to meet the deliverer.

In the example shown, the worker application 114 may ingest the aggregate code (step 416), example aspects of which are described above in connection with the step 316 of FIG. 3.

In the example shown, the worker application 114 may reconcile mismatches (step 420), example aspects of which are described in connection with the step 320 of FIG. 3. For example, the worker application 114 may receive an exception from the worker 103 to override mismatches between the expected identifiers and the identifiers ingested by the worker application 114. As another example, the worker application 114 may ingest a subsequent aggregate code provided by the deliverer application, and the subsequent aggregate code may include a list of identifiers that matches the list of expected identifiers.

In the example shown, the worker application 114 may update the backend platform 106 (step 422). For example, the worker application 114 may provide data associated with the data exchange between the worker application 114 and the deliverer application 126 to the backend platform 106. For instance, the worker application 114 may provide the list of load identifiers ingested by the deliverer application 126 to the backend platform 106 or may provide package identifiers associated with the loads picked up by the deliverer 105 to the backend platform 106.

Figure 5:
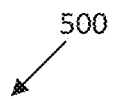
FIG. 5 is a flowchart of an example method according to aspects of the present disclosure.
Figure 5:
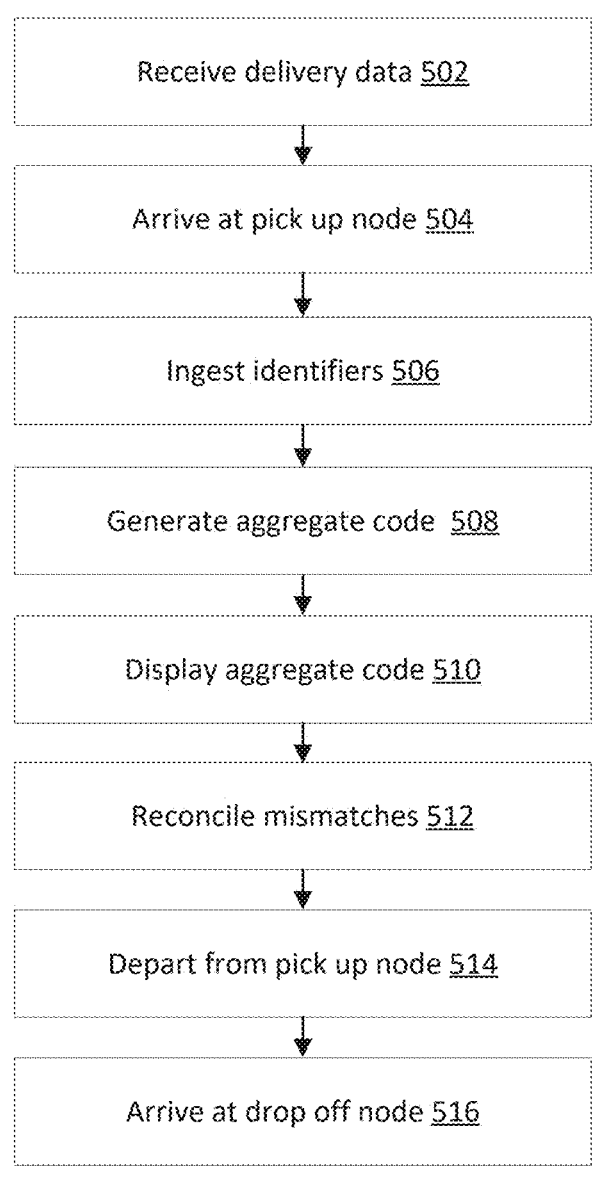

FIG. 5 is a flowchart of an example method 500 that may be performed by the deliverer device 104, the deliverer 105, the deliverer application 126, or a combination thereof.

In the example shown, the deliverer application 126 may receive delivery data (step 502). The delivery data may be data associated with deliveries to be performed by the deliverer 105. The delivery data may include a plurality of nodes, such as one or more source nodes and one or more destination nodes, and may include identifiers of loads or packages that are to be transported by the deliverer 105. In some embodiments, the deliverer application 126 receives delivery data from the backend platform 106. In some embodiments, the deliverer application 126 receives delivery data after being assigned by a dispatcher to transport certain loads. In some embodiments, the deliverer application 126 may receive delivery data in real time, such that, upon creation of loads by the worker application 114, deliver data associated with the loads may be automatically routed via the backend platform 106. In some embodiments, receiving delivery data includes receiving updates to previously assigned deliveries. For example, the deliverer application 126 may receive an adjustment to a route or loads to be picked up based on an available capacity of a vehicle of the deliverer 105, which may, in some instances, be calculated in real time as the deliverer application 126 ingests load identifiers across different pick up nodes.

In the example shown, the deliverer device 104 arrives at a pickup node (step 504). For example, the deliverer device 104 and the deliverer 105 may arrive at a node at which the worker device 102 is located and from which loads are to be picked up. In some embodiments, the location-determining device 134, or a device communicatively coupled with the location-determining device 134, may determine that the deliverer device 104 is or is about to arrive at the pickup node. In response to such a determination, the deliverer device 104 may automatically send a notification to the backend platform 106 that the deliverer device is arriving, and the backend platform 106 may automatically send a notification to the worker application 114.

In the example shown, the deliverer application 126 may ingest identifiers (step 506), example aspects of which are described in connection with the step 312 of FIG. 3.

In the example shown, the deliverer application 126 may generate an aggregate code (step 508), example aspects of which are described in connection with the step 314 of FIG. 5.

In the example shown, the deliverer application 126 may display the generated aggregate code (step 510). For example, the deliverer application 126 may display the aggregate code using the display 136 of the deliverer device 104.

In the example shown, the deliverer application 126 may reconcile mismatches between the identifiers ingested by the deliverer application 126 and the identifiers expected to be ingested by the deliverer application 126 (step 512), example aspects of which are described in connection with the step 320 of FIG. 3. In some embodiments, the deliverer application 126 may receive a notification that there is a mismatch from the worker application 114 after the worker application 114 scans the aggregate code from a display of the deliverer device 104. In some embodiments, the worker application 114 itself may determine that there is a mismatch. For example, the worker application 114 may compare a list of ingested identifiers with a list of identifiers received from the backend platform 106 corresponding to loads to be transported by the deliverer 105. In some embodiments, the deliverer application 126 may receive a manual input that there is a mismatch. To reconcile a mismatch, the deliverer application 126 may, in some instances, ingest additional identifiers, such as by scanning additional codes affixed to additional loads. As another example, the deliverer application 126 may receive an indication of an exception from the deliverer 105 to override the mismatch.

In the example shown, the deliverer device 104 may depart form the pickup node (step 514). For example, after completing an exchange with the worker application 114, the deliverer application 126 may determine that the deliverer 105 has picked up all required loads from the pickup node and can depart. In some embodiments, the deliverer application 126 may provide data corresponding to the picked-up loads to the backend platform 106. In some embodiments, the deliverer application 126 may receive an input from the deliverer 105 indicating that the deliverer 105 is departing the pickup node.

In the example shown, the deliverer device 104 may arrive at a drop off node (step 516). A drop off node may be a location at which the deliverer drops off the loads that the deliverer 105 picked up at a node of the worker device 102. In some embodiments, the drop off node is the sortation center 108. In some embodiments, prior to arriving at the drop off node, the deliverer 105 may travel to additional pickup nodes to pick up more loads prior to going to the drop off node. In some embodiments, the location-determining device 134, or a device communicatively coupled with the location-determining device 134, may determine that the deliverer device 104 is at or is about to arrive at the drop off node. In response to this determination, the deliverer device 104 may automatically notify the backend platform 106, which may send a notification to the sortation center 108.

Figure 6:
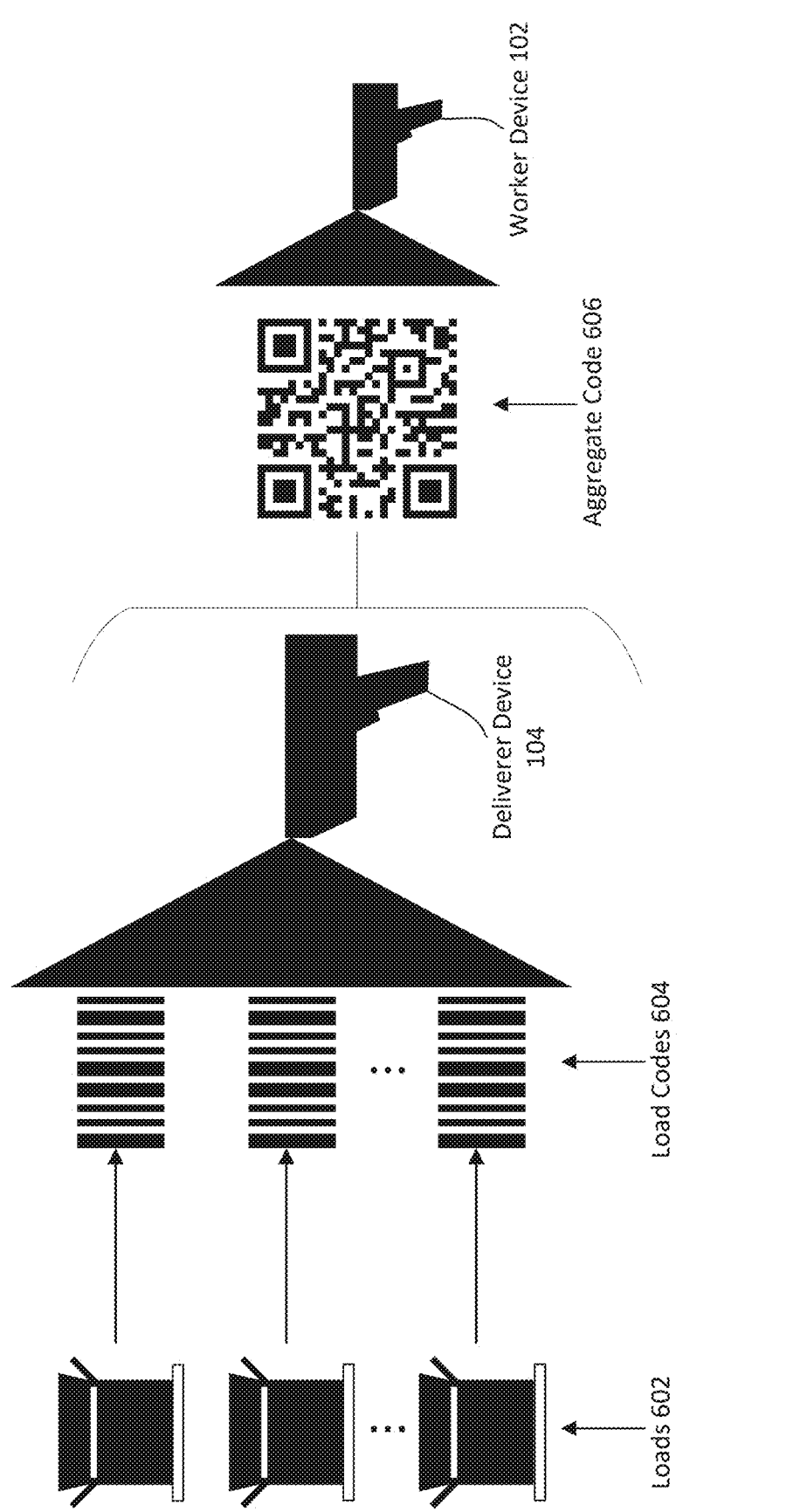
FIG. 6 illustrates a schematic diagram of codes and ingestions devices.

FIG. 6 illustrates a schematic example of certain aspects of the present disclosure. The example of FIG. 6 illustrates a plurality of loads 602, which may be located, for example, at a pickup node. Each of the plurality of loads 602 may include a load code of the load codes 604 affixed thereon. In the example shown, the plurality of load codes 604 are barcodes. Each code of the plurality of load codes 604 may encode an identifier associated with the respective load.

Continuing with the example of FIG. 6, the deliverer device 104 may, in some embodiments, be a specialized device for scanning codes. In the example shown, the deliverer device 104 scans the plurality of load codes 604. As such, the deliverer device 104 may read the identifiers encoded by the load codes 604. The deliverer device 104 may generate the aggregate code 606, which may include, for example, a list of the plurality of identifiers ingested by the deliverer device 104 by scanning the plurality of load codes 604. In the example shown, the aggregate code 606 is a barcode and may, in some instances, be displayed on a screen of the deliverer device 104.

Continuing with the example of FIG. 6, the worker device 102 may scan the aggregate code 606. For example, the worker device 102 may scan the aggregate code 606 from a screen of the deliverer device 104. By doing so, the worker device 102 may read the identifiers encoded by the aggregate code 606. The worker device 102 may compare the load identifiers of the aggregate code 606 to expected load identifiers to determine whether the deliverer device 104 ingested all expected identifiers.

Figure 7:
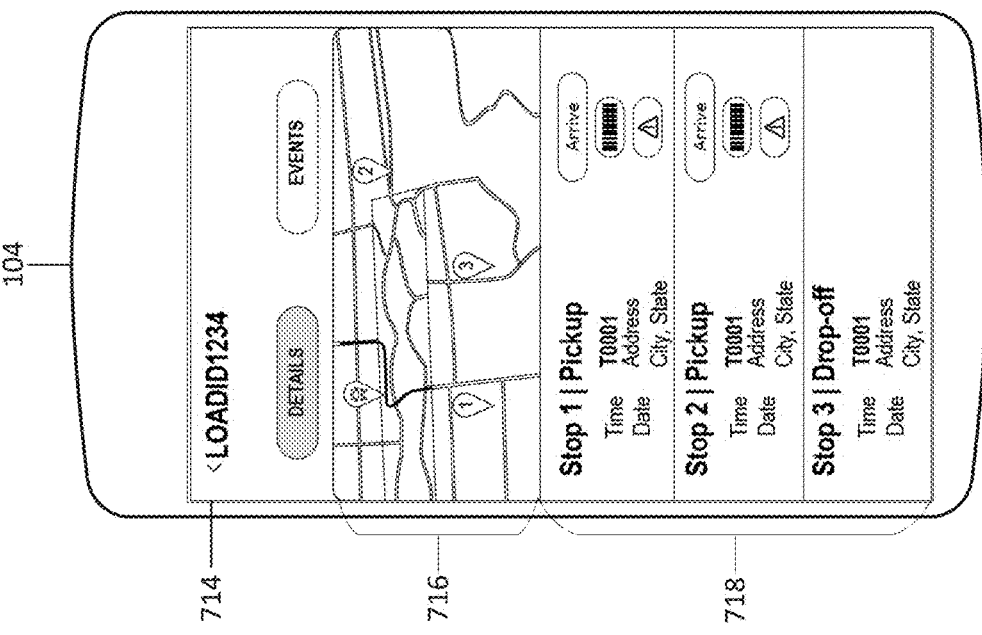
FIG. 7 illustrates example user interfaces of applications disclosed herein.
Figure 7:
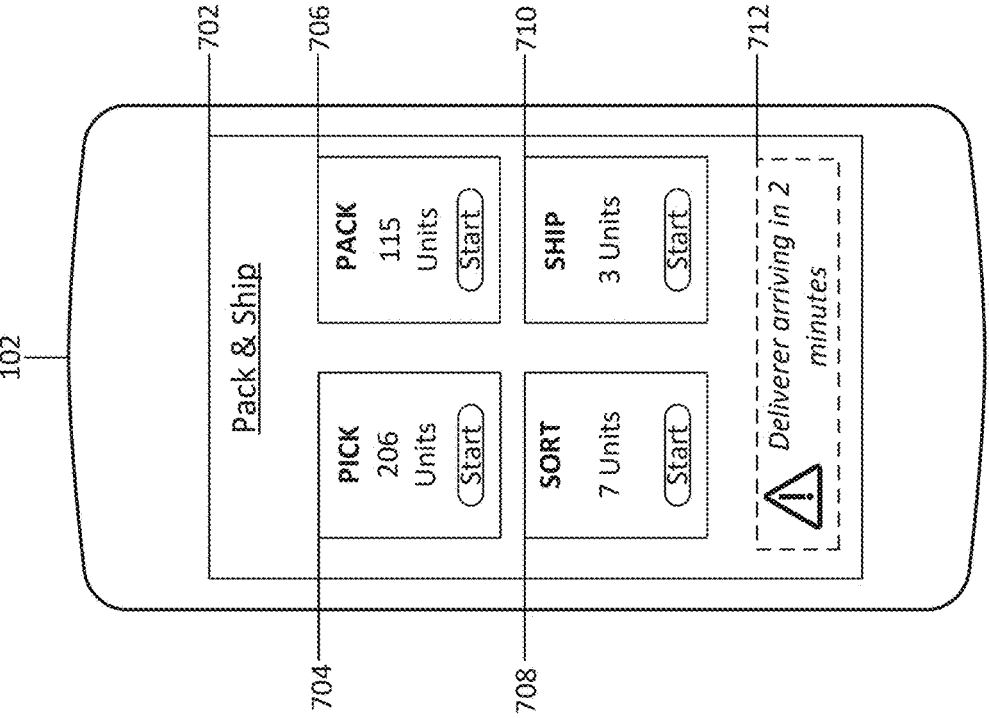

FIG. 7 illustrates an example user interface 702 of the worker application 114 and an example user interface 714 of the deliverer application 126.

The user interface 702 includes features that may be used, for example, to prepare one or more of packages or loads to be shipped. In some embodiments, one or more of the features provided via the user interface 702 may be used to create loads. In the example shown, the user interface 702 includes the following: a pick feature 704, which may be used to select items from a storage area or shelf to be packaged; a pack feature 706, which may be used to pack items into packages, including affixing package codes to packages; a sort feature 708, which may be used to to sort packages or loads; and a ship feature 710, which may be used to ships loads of packages. Additionally, the user interface 702 includes an alert region 712, which may display notifications, such as a notification that a deliverer is arriving.

The user interface 714 includes features that may be used, for example, to transport loads. In the example shown, the user interface 714 includes a navigation region 716 and a stops region 718. The navigation region 716 may display navigation data, such as for example, a map, a location of the deliverer device, and locations of pickup nodes or drop off nodes. The stops region 718 may include details of pickup nodes or drop off nodes associated with the loads to be transported by the deliverer 105. For example, for each stop, the stop region may include a stop type, such as drop off node or pickup node, a time at which the deliverer 105 is scheduled to arrive at the stop, stop details, and one or more functions that the deliverer application 126 may perform relative to the stop, such as scanning codes of loads at a stop, generating an alert related to a stop, or indicating an arrival at a stop.

Figure 8:
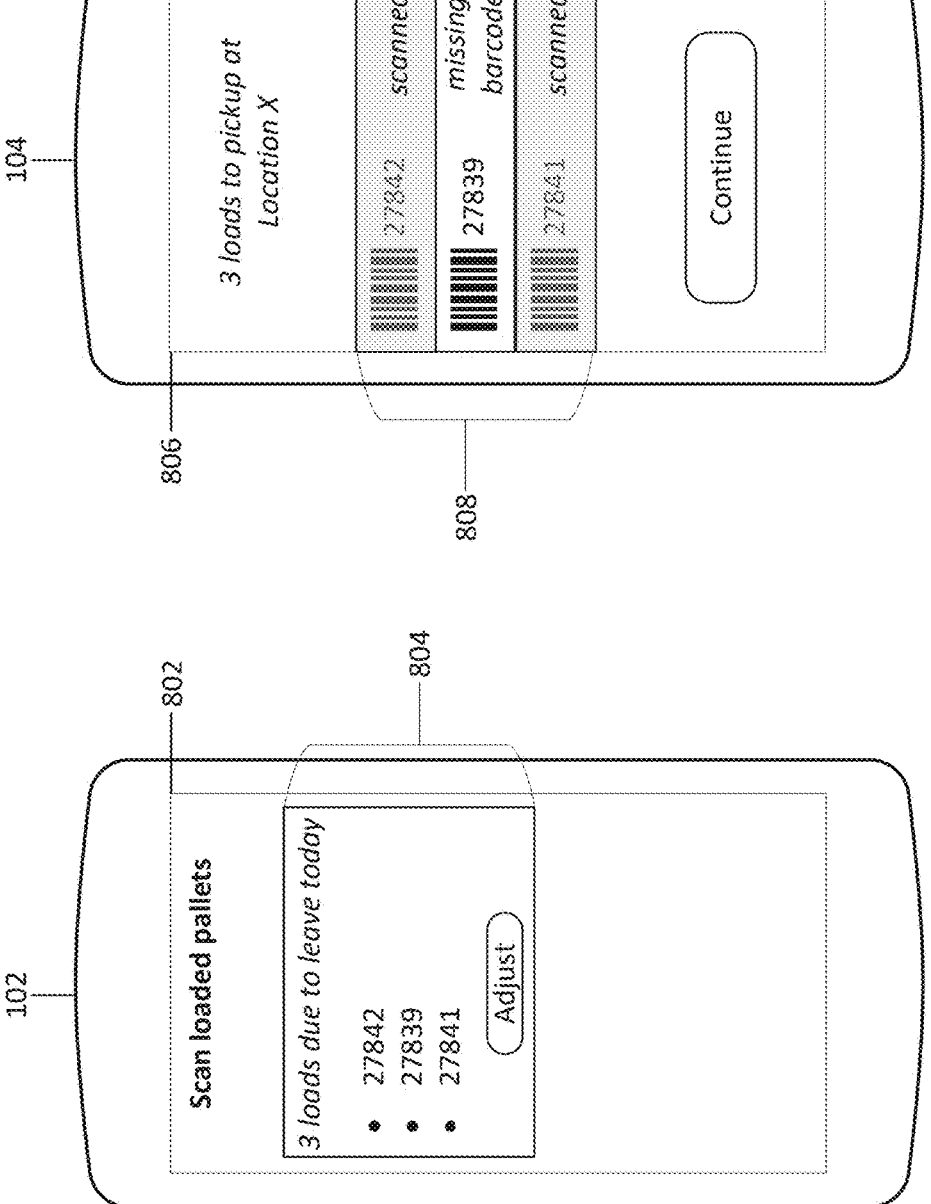
FIG. 8 illustrates example user interfaces of applications disclosed herein.

FIG. 8 illustrates an example user interface 802 of the worker application 114 and an example user interface 806 of the deliverer application 126.

The user interface 802 includes a load details region 804 that displays a plurality of load identifiers to be shipped from a node associated with the worker device 102. In some embodiments, the load details region 804 displays the identifiers that the worker application 114 expects the deliverer application 126 to ingest. In some embodiments, the user interface 802 may include an input field via which the worker application 114 may receive edits to the expected identifiers. In some embodiments, the user interface 802 may include a feature for scanning codes corresponding to identifiers to add to the expected identifiers.

The user interface 806 includes a load details region 808 that includes details of loads to be picked up by the deliverer 105 at a node. In some embodiments, the user interface 806 may be used by the deliverer 105 to scan codes. The load details region 808 may include a list of loads that the deliverer 105 is scheduled to pickup or that are associated with codes that have been scanned by the deliverer application. In the example shown, each load of the load details region includes its corresponding identifier and an ingestion status, which may indicate whether a code for the load was properly scanned, and if not, a reason for which the code was not scanned, which may be input by the deliverer 105 or automatically determined by the deliverer application 126.

Figure 9:
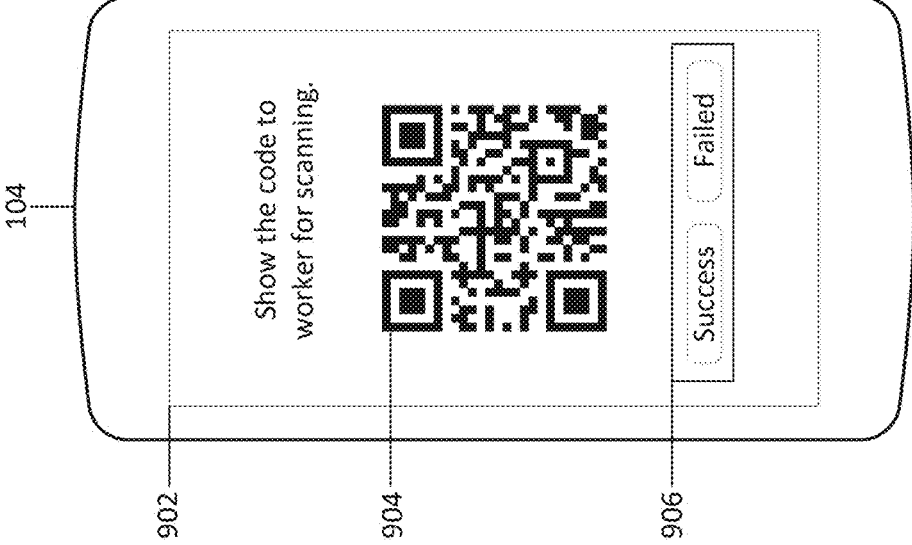
FIG. 9 illustrates example user interfaces of applications disclosed herein.
Figure 9:
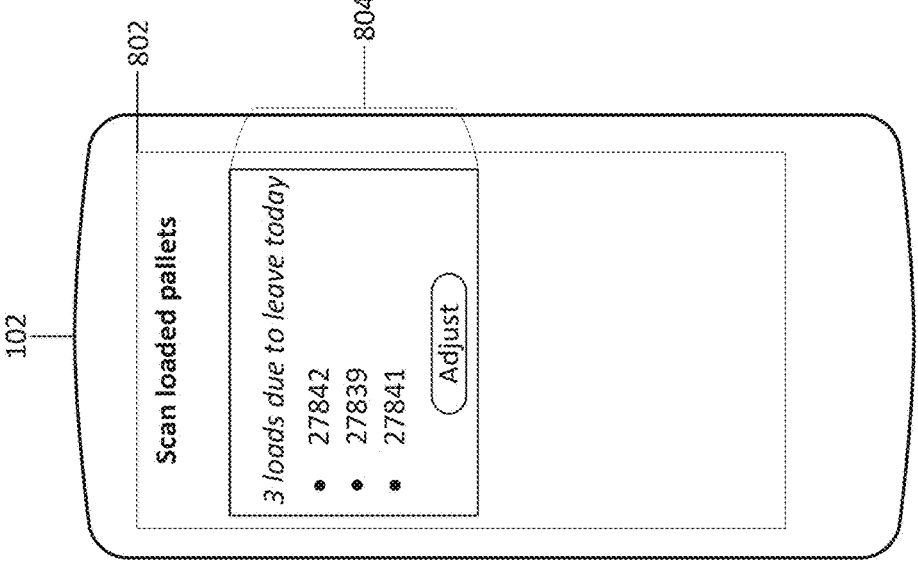

FIG. 9 illustrates the user interface 802 of the worker application 114 and a user interface 902 of the deliverer application 126.

The user interface 902 includes an aggregate code 904 and a confirmation region 906 for receiving an input regarding whether a handoff was successful. The worker application 114 may scan the aggregate code 904, which may encode identifiers ingested by the deliverer application 126, displayed on the user interface 902. In the example shown, the deliverer application 126 may receive via the confirmation region 906 an input indicating whether the worker application 114 successfully scanned the aggregate code and matched ingested identifiers with expected identifiers or whether the worker application 114 failed to scan the aggregate code 904 or failed to successfully match the identifiers ingested by the deliverer application 126 with identifiers that the identifiers that the worker application 114 expected the deliverer application 126 to ingest.

Figure 10:
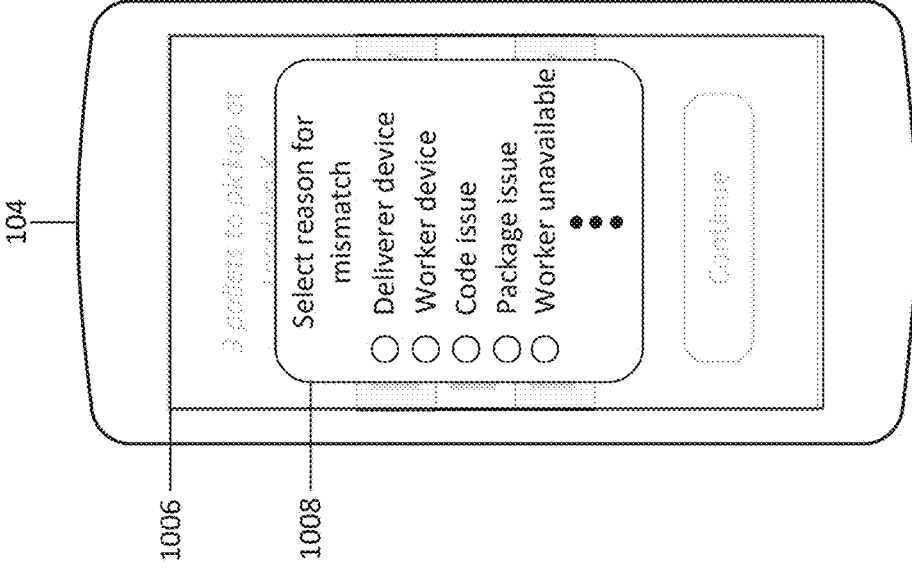
FIG. 10 illustrates example user interfaces of applications disclosed herein.
Figure 10:
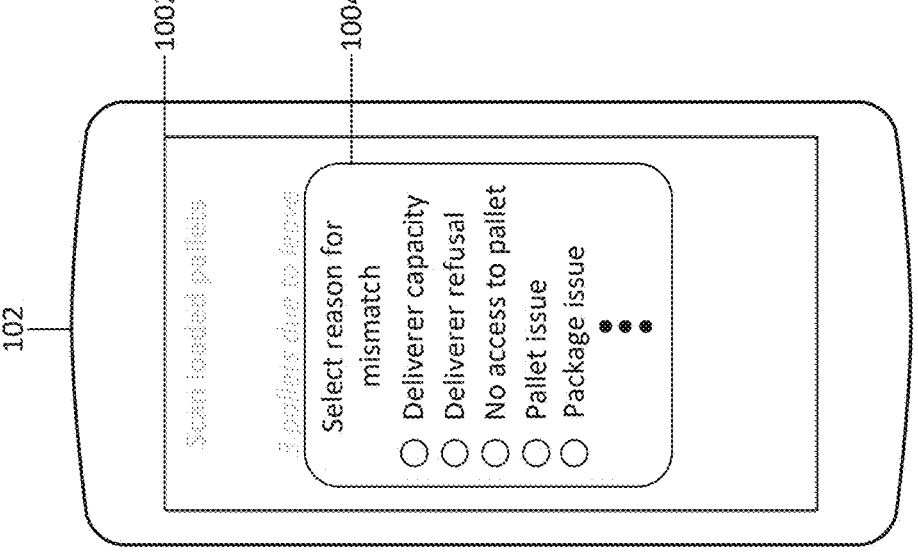

FIG. 10 illustrates a user interface 1002 of the worker application 114 and a user interface 1006 of the deliverer application 126. The user interfaces 1002 and 1006 may be used by the worker application 114 and the deliverer application 126, respectively, to reconcile a mismatch in identifiers. The user interfaces 1002 and 1006 include input fields 1004 and 1008, respectively, via which the worker application 114 and the deliverer application 126 may receive exceptions to override an identifier mismatch. Example exceptions that may be selected are illustrated in the example of FIG. 10.

Figure 11:
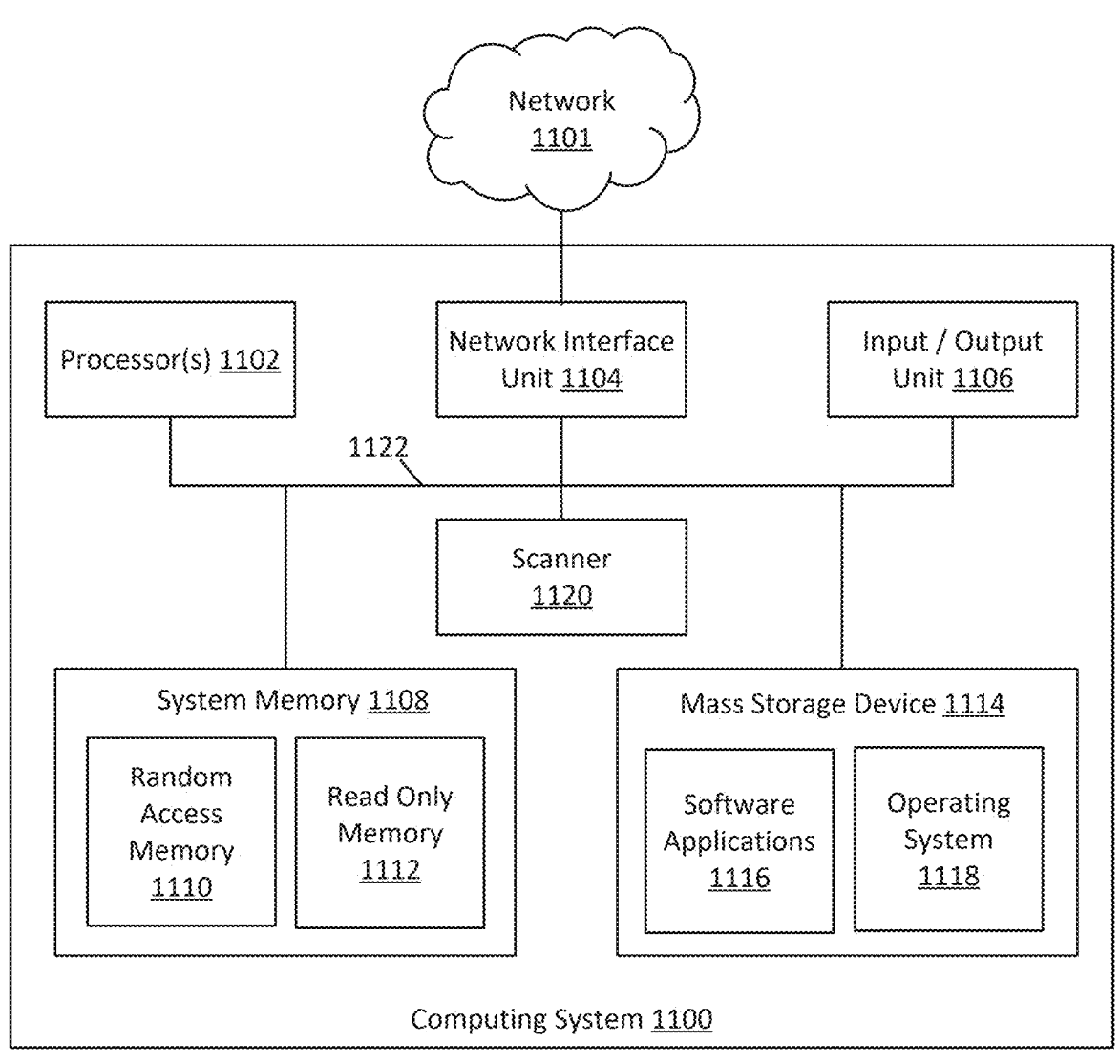
FIG. 11 illustrates an example block diagram of a computing system.

FIG. 11 illustrates an example block diagram of a virtual or physical computing system 1100. One or more aspects of the computing system 1100 can be used to implement the system and processes described herein. For example, one or more of the worker device 102, the deliverer device 104, the backend platform 106, or the printer 110 may be implemented using aspects of the computing system 1100.

In the embodiment shown, the computing system 1100 includes one or more processors 1102, a system memory 1108, and a system bus 1122 that couples the system memory 1108 to the one or more processors 1102. The system memory 1108 includes RAM (Random Access Memory) 1110 and ROM (Read-Only Memory) 1112. A basic input/output system that contains the basic routines that help to transfer information between elements within the computing system 1100, such as during startup, is stored in the ROM 1112. The computing system 1100 further includes a mass storage device 1114. The mass storage device 1114 is able to store software instructions and data. The one or more processors 1102 can be one or more central processing units or other processors. The mass storage device 1114 is connected to the one or more processors 1102 through a mass storage controller (not shown) connected to the system bus 1122.

The mass storage device 1114 and its associated computer-readable data storage media provide non-volatile, non-transitory storage for the computing system 1100. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1100.

According to various embodiments of the invention, the computing system 1100 may operate in a networked environment using logical connections to remote network devices through the network 1101. The network 1101 is a computer network, such as an enterprise intranet and/or the Internet. The network 1101 can include a LAN, a Wide Area Network (WAN), the internet, wireless transmission mediums, wired transmission mediums, other networks, and combinations thereof. The computing system 1100 may connect to the network 1101 through a network interface unit 1104 connected to the system bus 1122. It should be appreciated that the network interface unit 1104 may also be utilized to connect to other types of networks and remote computing systems. The computing system 1100 also includes an input/output controller 1106 for receiving and processing input from a number of other devices, including a touch user interface display screen, or another type of input device. Similarly, the input/output controller 1106 may provide output to a touch user interface display screen or other type of output device.

As mentioned briefly above, the mass storage device 1114 and the RAM 1110 of the computing system 1100 can store software instructions and data. The software instructions include an operating system 1118 suitable for controlling the operation of the computing system 1100. The mass storage device 1114 and/or the RAM 1110 also store software instructions, that when executed by the one or more processors 1102, cause one or more of the systems, devices, or components described herein to provide functionality described herein. For example, the mass storage device 1114 and/or the RAM 1110 can store software instructions that, when executed by the one or more processors 1102, cause the computing system 1100 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, two or more operations can be performed as a single operation, additional operations can be performed, and disclosed operations can be excluded without departing from the present disclosure. Further, certain operation can be accomplished via one or more sub-operations. The disclosed methods and processes, or aspects of the disclosed methods and processes, can be repeated. Moreover, although certain operations are described as being performed by certain components, other components may perform such operations, depending on the embodiment, as will be understood by those having ordinary skill in the art.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for data communication regarding load information among a plurality of user devices, the method comprising:

by a printer communicatively coupled with a first mobile application installed on a first mobile device, printing a plurality of codes corresponding to a plurality of identifiers, the plurality of identifiers being associated with a plurality of loads;

by the first mobile device, sending the plurality of identifiers to a backend platform;

by a second mobile application installed on a second mobile device, scanning, using a second scanner of the second mobile device, the plurality of codes, wherein the plurality of codes are affixed to the plurality of loads;

by the second mobile application, generating an aggregate code that encodes the identifiers ingested by the second mobile application, wherein the identifiers ingested by the second mobile application correspond to the codes scanned by the second mobile application;

by the second mobile application, displaying the aggregate code on a screen of the second mobile device;

by the first mobile application, scanning, using a first scanner of the first mobile device, the aggregate code displayed on the screen of the second mobile device;

by the first mobile application, parsing the aggregate code to determine the identifiers that were ingested by the second mobile application; and by the first mobile application, comparing the identifiers that were ingested by the second mobile application to the plurality of identifiers to determine whether the second mobile application ingested each identifier of the plurality of identifiers.

2. The method of claim 1, further comprising:

by the second mobile application, determining a location of the second mobile device by using a global positioning system (GPS) of the second mobile device;

by the second mobile application, sending the location of the second mobile device to the backend platform;

by the backend platform, determining, based at least in part on the location of the second mobile device, that the second mobile device is arriving at a node of the plurality of loads; and by the backend platform, automatically sending a notification to the first mobile device that the second mobile device is arriving at the node of the plurality of loads.

3. The method of claim 1, further comprising performing a reconciliation process in response to determining that the second mobile application did not ingest each identifier of the plurality of identifiers, the reconciliation process comprising receiving an exception at one or more of the first mobile application or the second mobile application.

4. The method of claim 1, further comprising performing a reconciliation process in response to determining that the second mobile application did not ingest each identifier of the plurality of identifiers, the reconciliation process comprising:

by the second mobile application, scanning, using the second scanner of the second mobile device, an additional code affixed to an additional load;

by the second mobile application, regenerating the aggregate code, the regenerated aggregate code encoding data associated with the plurality of codes and the additional code;

by the second mobile application, displaying the regenerated aggregated code on the screen of the second mobile device; and by the first mobile application, scanning, using the first scanner of the first mobile device, the regenerated aggregate code displayed on the screen of the second mobile device.

5. The method of claim 1, wherein the first scanner comprises a first camera and the second scanner comprises a second camera.

6. The method of claim 1, further comprising, by the first mobile application, adding a plurality of packages to a first load of the plurality of loads by scanning, using the first scanner of the first mobile device, a plurality of package codes affixed to the plurality of packages.

7. The method of claim 6, further comprising, after sending the plurality of identifiers to the backend platform, altering, by the first mobile application, the first load by adding an additional package to the first load or removing a package from the first load.

8. The method of claim 1, further comprising:
after determining that the second mobile application ingested each identifier of the plurality of identifiers, sending, by one or more of the first mobile application or the second mobile application, a pickup notification to the backend platform;
by the backend platform, receiving the pickup notification; and
by the backend platform, automatically sending, in response to receiving the pickup notification, package identifiers associated with the plurality of loads to a computing system of a sortation center.

9. The method of claim 1, further comprising:
after determining that the second mobile application ingested each identifier of the plurality of identifiers, sending, by one or more of the first mobile application or the second mobile application, a pickup notification to the backend platform;
by the backend platform, receiving the pickup notification; and
by the backend platform, automatically sending, in response to receiving the pickup notification, package identifiers associated with the plurality of loads to a package tracking system.

10. The method of claim 1,
wherein the plurality of loads corresponds with a subset of loads scheduled to be delivered on a day; and
wherein the plurality of identifiers corresponds with a subset of identifiers associated with the subset of loads.

11. The method of claim 1, wherein each load of the plurality of loads includes a plurality of packages.

12. The method of claim 11, wherein the plurality of packages are delivered from a retail store to a sortation center.

13. The method of claim 1, wherein the first mobile application is different from the second mobile application.

14. The method of claim 1, further comprising:
by the backend platform, identifying the second mobile device from a plurality of deliverer devices; and
by the backend platform, sending the plurality of identifiers to the second mobile device.

15. A data communication system comprising:
a first mobile device comprising a first mobile application, the first mobile application being communicatively coupled with a printer;
a second mobile device comprising a second mobile application; and
a platform communicatively coupled with the first mobile device and the second mobile device;
wherein the first mobile device includes a first memory storing first instructions associated with the first mobile application that, when executed by a first processor, cause the first mobile device to:
print, using the printer, a plurality of codes corresponding to a plurality of identifiers, the plurality of identifiers being associated with a plurality of loads; and
send the plurality of identifiers to the backend platform;

wherein the platform includes a second memory storing second instructions that, when executed by a second processor, cause the platform to:
receive the plurality of identifiers from the first mobile device;
identify the second mobile device from among a plurality of deliverer devices; and
send the plurality of identifiers to the second mobile device;
wherein the second mobile device includes a third memory storing third instructions associated with the second mobile application that, when executed by a third processor, cause the second mobile device to:
receive the plurality of identifiers:
scan a plurality of codes affixed to a plurality of available loads at a node;
generate an aggregate code that encodes data corresponding to the plurality of scanned codes; and
display the aggregate code on a screen of the second mobile device;
wherein the first instructions, when executed by the first processor, further cause the first mobile device to:
scan the aggregate code displayed on the screen of the second mobile device; and
compare data of the aggregate code to the plurality of load identifiers sent from the first mobile device.

16. The system of claim 15,
wherein the first mobile device is operated by a store employee; and
wherein the second mobile device is operated by a deliverer.

17. The system of claim 15, wherein the second instructions, when executed by the second processor, further cause the platform to:
after the comparison of the data of the aggregate code to the plurality of load identifiers sent from the first mobile device, receive a plurality of identifiers ingested by the second mobile device;
determine an available capacity of a vehicle associated with the second mobile device;
based on the available capacity, alter a delivery schedule for the second mobile device; and
send the altered delivery schedule to the second mobile device.

18. The system of claim 15,
wherein the first mobile application and the second mobile application are different applications; and
wherein the first mobile application and the second mobile application are provided by a common entity.

19. A method for data communication regarding load information among a plurality of user devices, the method comprising:
by a printer, printing a plurality of codes corresponding to a plurality of identifiers, the plurality of identifiers being associated with a plurality of loads;
by a first processor of a first mobile device, sending the plurality of identifiers to a backend platform;
by the second processor, scanning, using a second scanner of the second mobile device, the plurality of codes, wherein the plurality of codes are affixed to the plurality of loads;
by the second processor, generating an aggregate code corresponding to the plurality of codes;
by the second processor, displaying the aggregate code on a screen of the second mobile device;

by the first processor, scanning, using a first scanner of the first mobile device, the aggregate code displayed on the screen of the second mobile device;

by the first processor, parsing the aggregate code to determine a plurality of identifiers ingested by the second mobile device; and by the first processor, comparing the plurality of identifiers ingested by the second mobile device to a plurality of expected identifiers.

20. The method of claim 19, further comprising, by the first processor, generating the plurality of expected identifiers by scanning the plurality of codes.

* * * * *